United States Patent
Wright et al.

(10) Patent No.: US 8,576,292 B2
(45) Date of Patent: Nov. 5, 2013

(54) HIGH DYNAMIC RANGE APPROACH FOR A CMOS IMAGER USING A ROLLING SHUTTER AND A GATED PHOTOCATHODE

(75) Inventors: James Corey Wright, Roanoke, VA (US); Rudolph G. Benz, II, Daleville, VA (US)

(73) Assignee: Exelis, Inc., McLean, VA (US)

( * ) Notice: Subject to any disclaimer, the term of this patent is extended or adjusted under 35 U.S.C. 154(b) by 657 days.

(21) Appl. No.: 12/771,334

(22) Filed: Apr. 30, 2010

(65) Prior Publication Data

US 2011/0267519 A1 Nov. 3, 2011

(51) Int. Cl.
*H04N 5/225* (2006.01)
*H01J 40/16* (2006.01)
*G09G 5/00* (2006.01)

(52) U.S. Cl.
USPC ............... 348/217.1; 348/229.1; 250/214 VT

(58) Field of Classification Search
None
See application file for complete search history.

(56) References Cited

U.S. PATENT DOCUMENTS

| | | | | |
|---|---|---|---|---|
| 4,935,817 A * | 6/1990 | Gilligan | ..................... | 348/217.1 |
| 6,307,586 B1 * | 10/2001 | Costello | ..................... | 348/216.1 |
| 7,327,393 B2 | 2/2008 | Ying et al. | | |
| 7,897,900 B2 * | 3/2011 | Tafas | ............................. | 250/207 |
| 2001/0019361 A1 * | 9/2001 | Savoye | ......................... | 348/222 |
| 2002/0089598 A1 * | 7/2002 | Ishimoto et al. | .............. | 348/311 |
| 2002/0195547 A1 * | 12/2002 | Ostromek et al. | ...... | 250/214 VT |
| 2004/0099793 A1 * | 5/2004 | Shamir et al. | ........... | 250/214 VT |
| 2005/0246143 A1 * | 11/2005 | Han et al. | ...................... | 702/189 |
| 2006/0011810 A1 * | 1/2006 | Ando et al. | ................ | 250/208.1 |
| 2006/0066750 A1 * | 3/2006 | Henderson et al. | ........... | 348/362 |
| 2006/0081770 A1 * | 4/2006 | Buchin | .................... | 250/214 VT |
| 2007/0097240 A1 * | 5/2007 | Egawa et al. | ................. | 348/308 |
| 2007/0103569 A1 * | 5/2007 | Kawahito | ...................... | 348/241 |
| 2007/0221849 A1 * | 9/2007 | Tabirian et al. | ............ | 250/341.1 |
| 2009/0108180 A1 * | 4/2009 | Saldana | .................. | 250/214 VT |
| 2010/0302282 A1 * | 12/2010 | Dobbie et al. | ................ | 345/666 |

* cited by examiner

*Primary Examiner* — John Villecco
*Assistant Examiner* — Dwight C Tejano
(74) *Attorney, Agent, or Firm* — Ratnerprestia

(57) ABSTRACT

An imaging system includes a photocathode, configured to be gated ON/OFF at a selected gating frequency, for converting photons from an object into electrons and selectively transmitting the electrons toward an imaging sensor. The imaging sensor is configured to receive the electrons and provide a rolling shutter read out of rows of pixels. The imaging sensor includes a variable well selectively set to charge the rows of pixels to a first intensity level during a first integration period and charge to a second intensity level during a second integration period. The second integration period is longer than an OFF time of the photocathode gating frequency. The first and second integration periods are equal to a frame duration of the imaging sensor, defining a number of frames per second, and the selected gating frequency of the photocathode is higher than the number of frames per second.

13 Claims, 9 Drawing Sheets

HIGH DYNAMIC RANGE APPROACH FOR A CMOS IMAGER USING A ROLLING SHUTTER AND A GATED PHOTOCATHODE

FIELD OF THE INVENTION

The present invention is related, in general, to CMOS image sensors. More specifically, the present invention is related to increasing the dynamic range of a CMOS image sensor when using a rolling shutter and a gated photocathode.

BACKGROUND OF THE INVENTION

CMOS image sensors are used widely, for example, in digital cameras and night vision goggle (NVG) devices. When exposed to light, the CMOS image sensor captures an image. The image sensor typically includes a large array of pixels that are organized into rows. There are times when the pixels in the array are not all exposed to light at the same time. Rather, the pixels are exposed sequentially, row by row. This method is known as a rolling shutter. The exposure time for a single row of pixels is called the exposure period. The total time required to expose and process the pixels in the entire array is known as the frame period.

Another method of capturing an image is known as a global shutter, or a snapshot operation. In this method, the start and end of integration for all rows in the imager is the same. Typically, at the end of integration, the pixel values are moved to storage capacitors to be read out while the next integration cycle begins.

One problem associated with the rolling shutter method is that the illumination level of the light source may vary over time. This variation is called flicker. When exposed to flicker, an image sensor may capture the flicker as bands of contrasting brightness in the final image. When exposed to very bright light, the final image may be overexposed.

FIG. 1 shows a basic three-transistor pixel circuit 101 used in prior art image sensor arrays. A transistor M1 connects a cathode (node 103) of a photodiode 125 to a voltage supply, Vdd 107. The anode of photodiode 125 is connected to ground. The gate of transistor M1 is connected to a reset signal 109. Transistor M3 connects Vdd 107 to another transistor M5. The gate of transistor M3 is connected to node 103. The gate of transistor M5 is controlled by a row select signal 111, while its source is connected to a column output line 113, from which the output of pixel circuit 101 is read. Transistor M3 is used as a source follower to buffer photodiode 125 and prevent it from being loaded down by column output line 113.

During operation, photodiode 125 is reset to the supply voltage Vdd 107 at the beginning of an exposure period, by asserting reset signal 109 and charging node 103. As photodiode 125 is exposed to incident light, it accumulates more charge and the voltage at node 103 decreases. The voltage across photodiode 125 is indicative of the light intensity that photodiode 125 has been exposed to over time. At the end of the exposure period, row select signal 111 is asserted to read out the values of a row of pixels in the image sensor array.

In operations using electronic image intensifiers ($EI^2$) the photodiode is not used. Charge is directly accumulated into the pixel capacitance, as it is "seeing" electrons not photons.

Pixel circuits are generally designed to improve pixel sensitivity under low-light conditions. However, if lighting conditions are too bright, the photodiode accumulates too much charge and reaches saturation, at which point the voltage at node 103 falls to zero. Further exposure of the photodiode cannot be registered, because the voltage cannot fall below zero. As a result, the output signal of the pixel is clipped, and the final image looks overexposed.

FIG. 2 shows two different transfer curves for the conversion gain of a pixel, such as that shown in FIG. 1, assuming that its gain could be varied. The figure plots the signal output of a pixel versus the intensity of the incident light during an exposure period. The saturation level of the photodiode in the pixel is indicated by dotted line 305. The line 307 is a transfer curve with one level of sensitivity, which clips at a low light intensity level. The line 309 is another transfer curve which provides lower sensitivity, but does not clip as early as line 307. It is desirable, therefore, to increase the dynamic range of a CMOS imager by preventing its pixels from saturating and clipping the received light intensity.

The dynamic range of a CMOS imager is further complicated when considering night vision goggle (NVG) systems. Referring to FIG. 3, there is shown an NVG system, designated generally as 30. The NVG system includes photocathode 31, multi-channel plate (MCP) 32 and CMOS imager 33. The light, as photons, are received by photocathode 31 and converted into electrons. The electrons are amplified by MCP 32 and sent to electron-sensing CMOS imager 33. The CMOS imager includes control and processing electronics (not shown) for providing a processed digital video output to a user.

Two control signals that are pertinent to the present invention are shown functionally in FIG. 3. As shown, a gated signal turns ON/OFF the photocathode, thereby acting as a shutter control for the photocathode. When the gated signal is ON, the photocathode permits received light to pass through the photocathode and be transmitted as electrons toward the CMOS imager. When the gated signal is OFF, however, the photocathode acts as a closed shutter and prevents light transmission to the CMOS imager.

The other control signal is referred to herein as Vresetlow, which sets a threshold voltage level in the CMOS imager, so that any light intensity above the set threshold voltage level is clipped. The operation of this control signal is explained by referring to FIGS. 4 and 5.

Referring first to FIG. 4, each pixel includes two integration periods, referred to herein as integration$_1$ and integration$_2$ (also referred to as t1 and t2). It will be understood that the duration of each integration period may be varied. For explanation purposes, FIG. 4 shows the period of integration$_1$ as 15 msec; and the period of integration$_2$ as 1 msec. Thus, to fully charge a pixel, an integration period of 16 msec is required, which includes integration$_1$ and integration$_2$.

At the pixel level of the imager, the integrated charge on the pixel has a predetermined set threshold level that the charge cannot exceed during the first period of the integration time (integration$_1$). In the example shown in FIG. 4, the charge cannot exceed 3000 ADUs during the first period. During the second period (integration$_2$), however, the Vresetlow is removed, so that the pixel is able to continue integrating, until a full charge is obtained at 4095 ADUs. It is assumed in the example that the full charge is 4095 ADUs and that the first integration period cannot charge above 3000 ADUs. It will be appreciated, however, that these ADU levels may be different and may be set to other levels.

The above described approach is known as a variable well. At the first integration period (for example 15 msec), the well of the pixel cannot charge above a set threshold (for example 3000 ADUs). During the second integration period (for example 1 msec), the well of the pixel is permitted to charge up to its full well capacity of 4095 ADUs (for example), designated as 41 in FIG. 4.

As demonstrated by curve 42 in FIG. 4, the pixel has a relatively bright input, so it quickly reaches the set threshold of 3000 ADUs. The pixel is held at that charge until 15 msec expires. The pixel is released after the 15 msec period to integrate up to its full well capacity. This helps the pixel in preventing saturation under high illumination conditions and, thereby, increases the dynamic range of the incoming light that the imager may capture. This is also referred to herein as a high dynamic range (HDR).

A different phenomenon, however, may be seen by examining curve 43. As shown, the pixel integrates during the first integration period. Because the light is not as bright, as compared to the light seen by the pixel integrating under curve 42, the pixel never reaches the Vresetlow threshold of 3000 ADUs. During the second integration period, the pixel is released to integrate again and continues to charge until the end of the frame period.

Similarly, upon examining curve 44, dark areas of an image never reach the Vresetlow threshold (3000 ADUs, for example). The pixel continues to integrate normally, as shown by curve 44.

Referring now to FIG. 5, there is shown an exemplary method for reading out pixel intensities during a rolling shutter operation. The example assumes that there are 1024 rows (also referred herein as lines) in the pixel array of the CMOS imager. As shown, the readout of frame$_{N-1}$ and frame$_N$ assumes a readout period of 16.67 msec (60 Hz image). Each frame is gated ON/OFF by a gated signal acting as a shutter on the photocathode. Line 1 of the pixel array is gated ON/OFF, as shown. Line 2 of the pixel array is gated ON/OFF at the same time as line 1, but is read out approximately 16 μsec later due to the rolling shutter operation. This delay is incurred by a line rate of approximately 62 kHz (1/line rate equals approximately 16 μsec). By the time line 512 is read out, during the rolling shutter, a delay of approximately 8.2 msec is incurred (512×16 μsec). By the time line 1024 is read out, during the rolling shutter, a delay of approximately 16.4 msec is incurred (1024×16 μsec).

Thus, as shown, each pixel integrates during frame$_{N-1}$ and frame$_N$. As the shutter rolls, each line has its integration time delayed by one row (approximately 16 μsec). In a 1280×1024 pixel array and using a 90 MHz clock to is read each pixel, it takes approximately 11.11 μsec to read each pixel. Therefore, as an example, each frame is read out in approximately 16 msec (1280×11.11 μsec equals approximately 16 msec).

When a variable well approach is added to a night vision device including a gated photocathode, the timing interaction between one frame and the next frame becomes more significant. Furthermore, when a rolling shutter approach is used (as compared to a global shutter approach), the timing interaction becomes even more significant. As will be explained, the present invention provides an improvement in the dynamic range of a CMOS imager, when all three of the above timing events are involved. In other words, when the CMOS imager's performance is based on (1) the line integration time, (2) the timing of the variable well's break-point during integration, and (3) the duty cycle of the gated pulse of the photocathode, the present invention provides an increased dynamic range for such a CMOS imager.

SUMMARY OF THE INVENTION

To meet this and other needs, and in view of its purposes the present invention provides an imaging system including a photocathode, configured to be gated ON/OFF at a selected gating frequency, for converting photons from an object into electrons and selectively transmitting the electrons toward an imaging sensor. The imaging sensor is configured to receive the electrons and provide a rolling shutter read out of rows of pixels. The imaging sensor includes a variable well selectively set to charge the rows of pixels to a first intensity level during a first integration period and charge to a second intensity level during a second integration period. The second integration period is longer than an OFF time of the photocathode gating frequency. In addition, the first and second integration periods are equal to a frame duration of the imaging sensor that defines a number of frames per second, and the selected gating frequency of the photocathode is higher than the number of frames per second.

The first intensity level is a variable set by a Vreset1 voltage, and the second intensity level is greater than or equal to the first intensity level. Furthermore, the second intensity level is less than or equal to a full well level of a pixel in the rows of pixels.

The rolling shutter readout provides a sequential read out of each row of pixels during at least one of the first and second integration periods. Each row of pixels is read out at a frequency of the number of frames per second.

The photocathode is configured to be gated OFF with a pulsed signal, denoted as a gate_off_time. The photocathode includes at least one gate_off time per frame of the imaging sensor, denoted as one gate_pulse_per_frame. The selected gating frequency includes a time period expressed as follows:

(gate_off_time/gate_pulse_per_frame) is less than the second integration period.

The time period of the (gate_off_time/gate_pulse_per_frame) is less than the second integration period by a factor of beta, where beta is an additional factor for providing a minimum amount of integration time. The selected gating frequency is increased to provide at least two gate_pulse_per_frame. The selected gating frequency may be at least 120 Hz, and a number of frames per second of the imaging sensor may be 60 Hz.

The selected gating frequency may be at least 960 Hz, and a number of frames per second of the imaging sensor may be 60 Hz.

In another embodiment of the present invention, a night vision goggle (NVG) system includes a photocathode, configured to be gated ON/OFF at a selected gating frequency, for converting photons from an object into electrons and selectively transmitting the electrons toward an imaging sensor. The imaging sensor is configured to receive the electrons and provide a rolling shutter read out of rows of pixels. The imaging sensor includes a variable well selectively set to charge the rows of pixels to a first intensity level during a first integration period and charge to a second intensity level during a second integration period. The second integration period is longer than an OFF time of the photocathode gating frequency. The first and second integration periods are equal to a frame duration of the imaging sensor, defining a number of frames per second, and the selected gating frequency of the photocathode is higher than the number of frames per second.

In still another embodiment of the present invention, a method of imaging in a night vision goggle system (NVG) includes the steps of:

gating a photocathode ON/OFF at a selected gating frequency;

receiving electrons from the photocathode, by an imager using a rolling shutter;

selectively charging pixels of the imager using a first integration period and a second integration period; and controlling the second integration period, so that it is longer than an OFF time period of the selected gating frequency.

Charging the pixels is provided during a frame period, defining a number of frames per second, and the selected gating frequency is higher than the number of frames per second.

The photocathode is configured to be gated OFF with a pulsed signal, denoted as a gate_off_time. The photocathode includes at least one gate_off time per frame of the imaging sensor, denoted as one gate_pulse_per_frame. The selected gating frequency includes a time period expressed as follows:

(gate_off_time/gate_pulse_per_frame) is less than the second integration period.
time.

The time period of the (gate_off_time/gate_pulse_per_frame) is less than the second integration period by a factor of beta, where beta is an additional factor for providing a minimum amount of integration time. The selected gating frequency is increased to provide at least two gate_pulse_per_frame.

It is understood that the foregoing general description and the following detailed description are exemplary, but are not restrictive, of the invention.

BRIEF DESCRIPTION OF THE FIGURES

The invention may be understood from the following detailed description when read in connection the accompanying figures.

DETAILED DESCRIPTION OF THE INVENTION

With a global shutter readout, the timing issues in the integration of charge by each pixel may be easily resolved since all three of the aforementioned timing events (namely, the pixel integration time, the variable well break-point timing during integration, and the duty cycle of the photocathode gated pulse) may be synchronized at beginning of the integration time. With a rolling shutter CMOS device, however, simply synchronizing the integration time, the variable break-point timing and the duty cycle of the gated pulse is not sufficient. In fact, the inventors discovered that simple synchronization of all three events may result in images having the bottom half of each frame completely destroyed.

Figure 1:
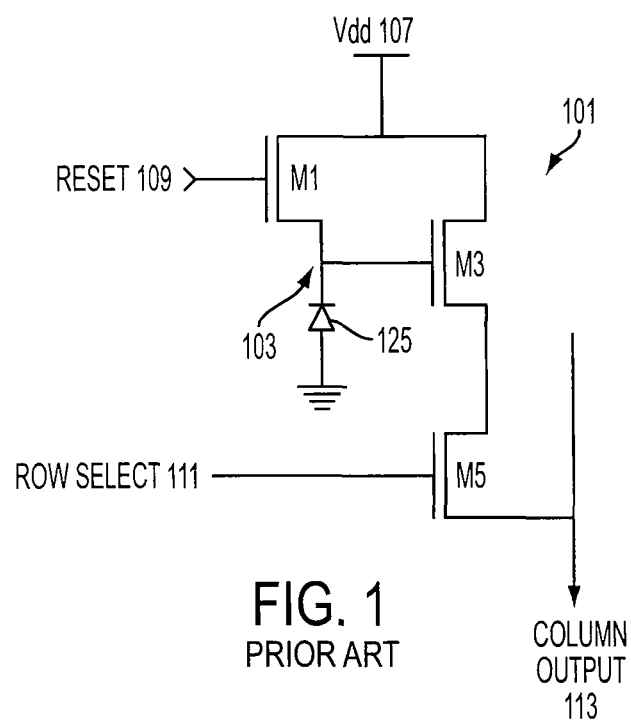
FIG. 1 is a conventional pixel circuit including three transistors that may be used in an array of an imaging sensor.
Figure 2:
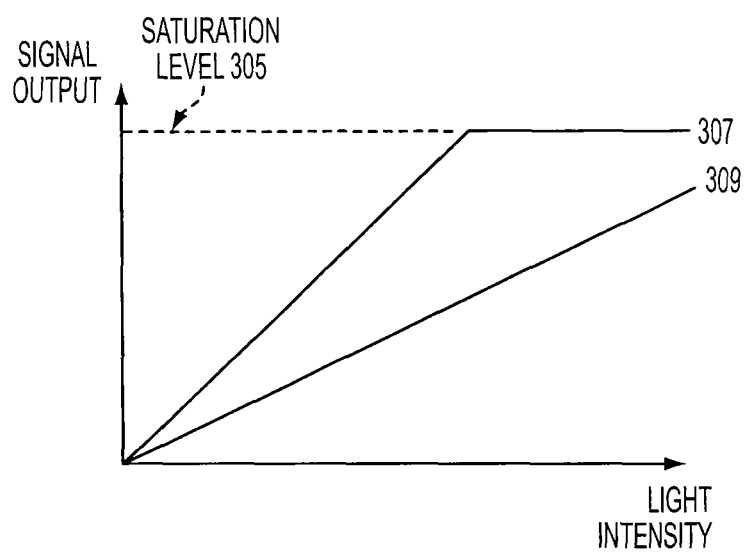
FIG. 2 shows two conversion gain curves for a pixel, such as the one shown in FIG. 1, having two different levels of gain.
Figure 3:
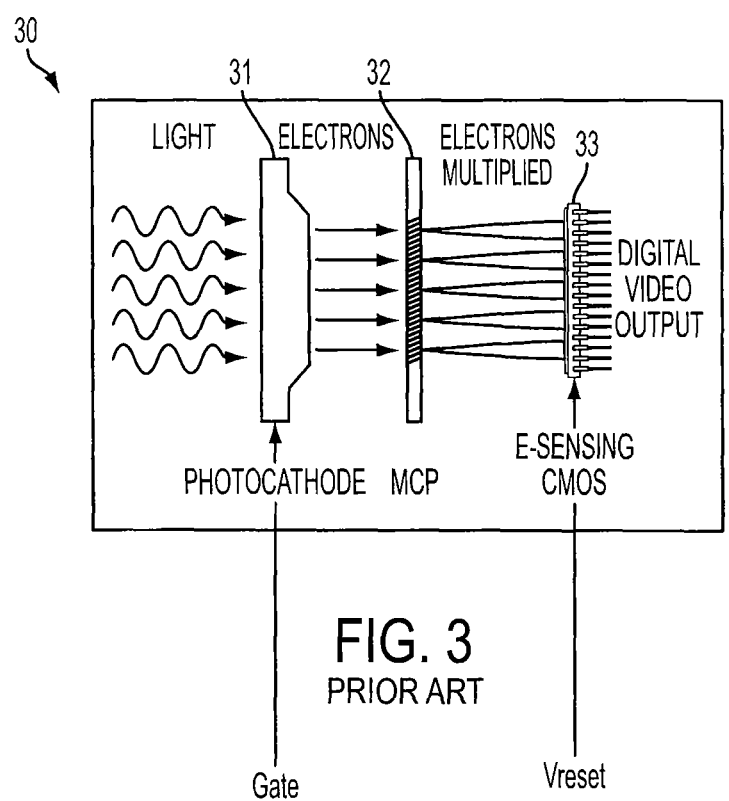
FIG. 3 is a functional diagram of a CMOS imager used in a conventional night vision goggle (NVG) system, including a photocathode gating pulse for shuttering the photocathode and a voltage reset signal for setting a threshold for a variable charging well of a pixel in an array of pixels.
Figure 4:
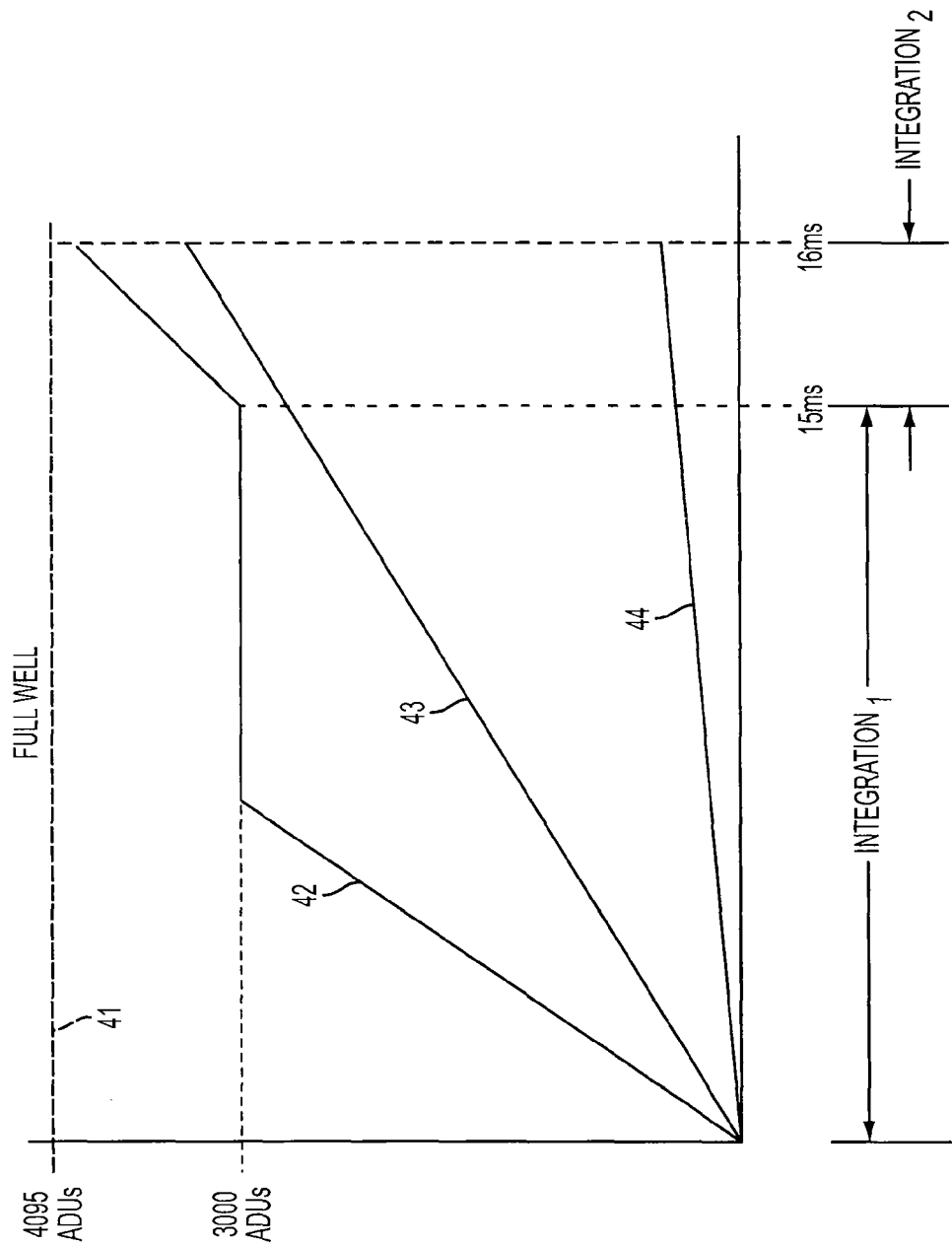
FIG. 4 shows three different curves for a pixel in an array of pixels, each curve depicting a different gain function during two integration periods.
Figure 5:
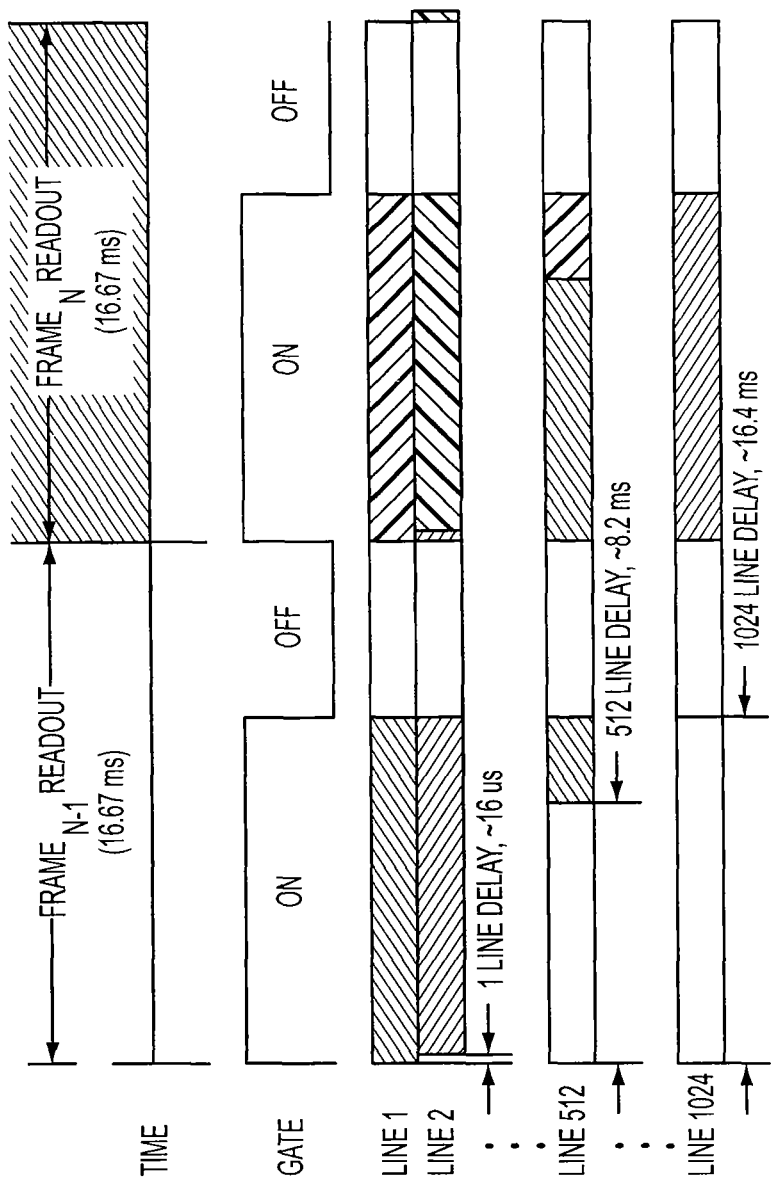
FIG. 5 is an exemplary timing diagram for reading out pixel intensities in multiple rows of an imaging array, during a rolling shutter operation and a photocathode ON/OFF gating control.
Figure 6:
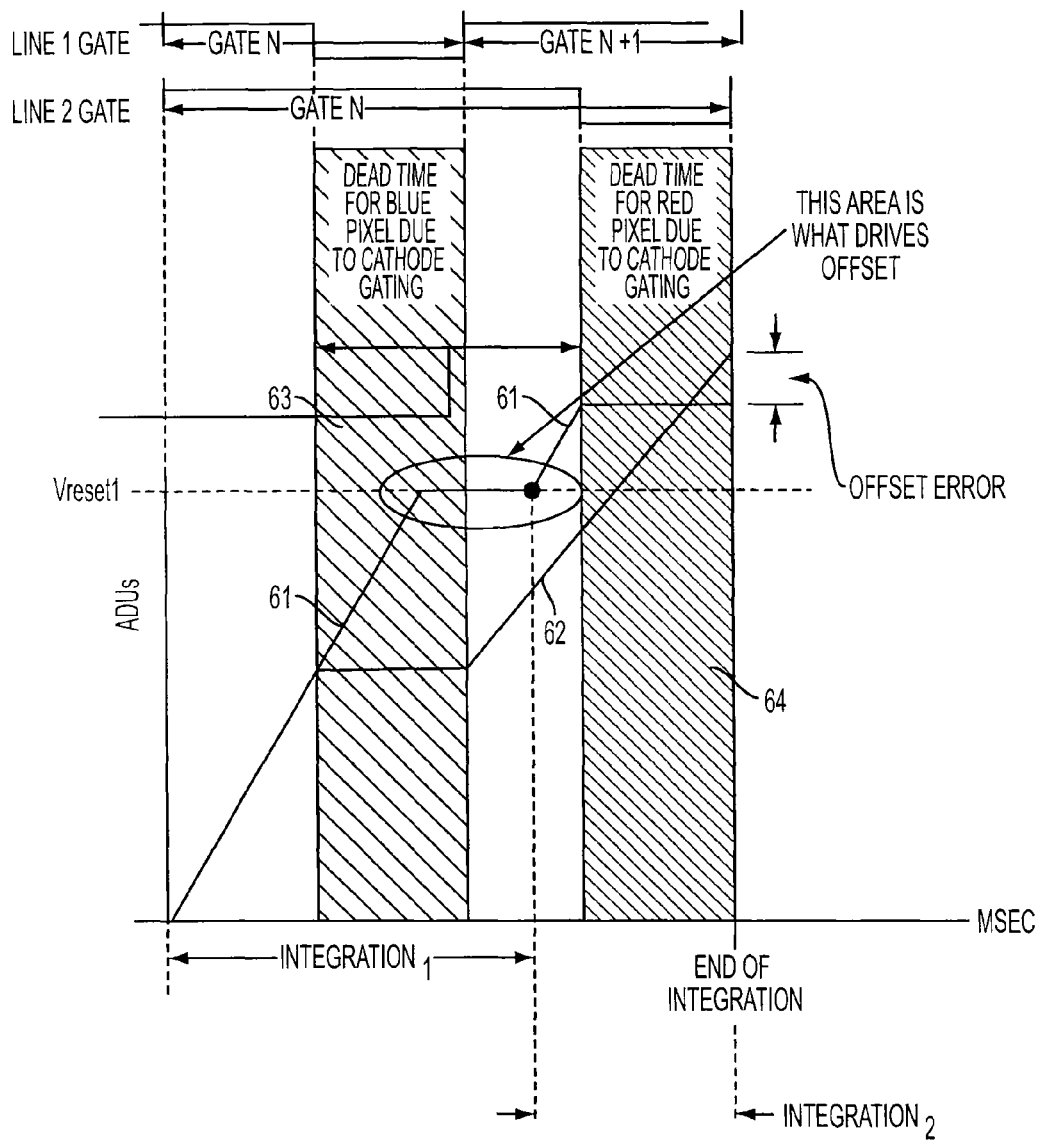
FIG. 6 is an exemplary timing diagram showing charges accumulated on pixels in two different rows of an imaging array, during a rolling shutter operation and a photocathode ON/OFF gating operation.

Referring now to FIG. 6, there is shown a charge accumulated on pixels in two different rows of a rolling shutter operation. The line 1 of the pixel array is gated ON by the line 1 gated pulse of the photocathode (shown as gate N). The line 512 is gated ON approximately 8.2 msec later (see FIG. 5) by the line 512 gated pulse of the photocathode.

While the gating of the photocathode occurs at the same time for all the lines (or rows) of each imaging frame, nevertheless, due to the rolling shutter delays between one row and another row, the integration of each row occurs partially during frame N and partially during frame N+1 (this is true for all rows, except row 1 (line 1) which integrates fully during frame N). This is also shown in FIG. 5, by way of example, as frame N−1 and frame N. It will be appreciated, however, that FIG. 6 is presented differently than FIG. 5. As shown in FIG. 6, the impact of the rolling shutter and the photocathode gating pulse on each line of pixels may be seen more clearly, because there is shown a synchronized integration starting time for each row of pixels, during one photocathode ON/OFF gating period. Thus, line 1 integrates completely during the gate N period, whereas line 512 integrates partially during the gate N period and partially during the gate N+1 period (compare this with the gating shown FIG. 5).

Still referring to FIG. 6, the frame integration period is divided into two integration periods (or regions), namely, integration time $t_1$ and integration time $t_2$. The time spent integrating in each region is controllable. In the example shown, integration time $t_1$ has approximately a 15 msec duration and integration time $t_2$ has approximately a 1 msec duration. This provides a total integration time for each line of 16 msec (actually 16.67 msec for a 60 Hz imager).

The clamping voltage (Vreset1) is also a controlled parameter which adjusts the voltage a pixel is clamped to during the first integration period, $t_1$. At the end of the first integration period, the pixel is released to integrate again during the second integration period, $t_2$.

Areas of uneven exposures (or offsets) are created in the imager depending on how the photocathode OFF times align with the pixel's integration regions (periods $t_1$ and $t_2$). As shown in FIG. 6, a pixel in line 1 is clamped at Vreset1, whereas a pixel in line 512 never clamps. The line 1 pixel charges as shown by curve 61. The pixel in line 1 charges until clamped at Vreset1. After start of the second integration period $t_2$, the pixel in line 1 is released and continues charging, until shuttered by the photocathode gate (shown as region 64.)

The pixel in line 512, however, never clamps. As shown, by curve 62, the pixel in line 512 charges until it is shuttered by the OFF time of the photocathode gate (region 63). At the next ON time of the photocathode gate, the pixel in line 512 continues charging again and is never clamped by the Vreset1 voltage. The pixel continues to charge, while it is in the second integration period, $t_2$, until it reaches the end of the frame integration time (period $t_1$ plus period $t_2$).

Because the pixel in line 512 never clamps, the pixel charges to a higher ADU level than the pixel in line 1, even though both lines of pixels experience an equivalent input flux. Notice that curve 62 reaches a higher ADU voltage than curve 61.

Figure 7:
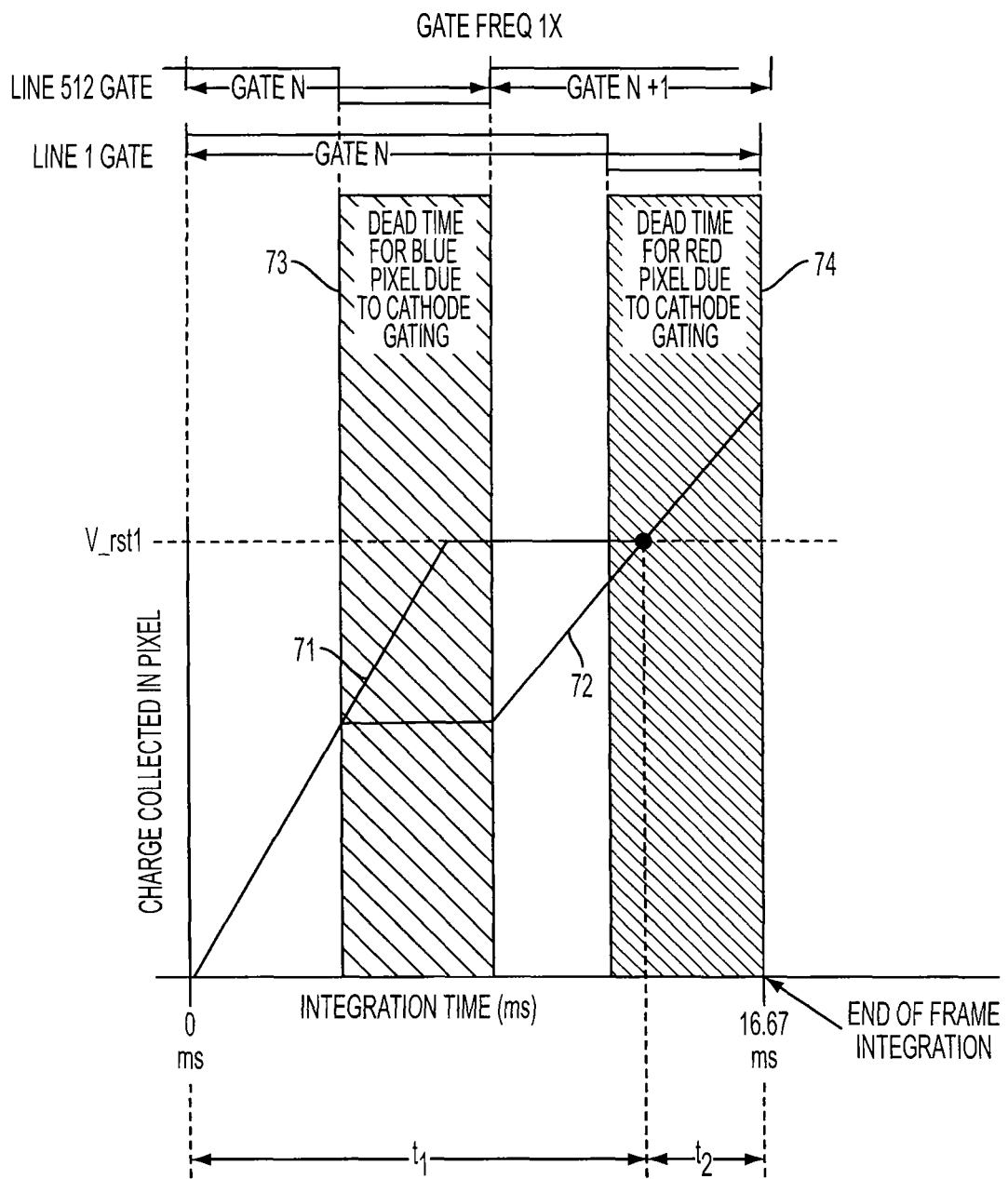
FIG. 7 is another exemplary timing diagram showing charges accumulated on pixels in two different rows of an imaging array, during a rolling shutter operation and a photocathode ON/OFF gating operation, in which the gating frequency is 1 times (1×) the number of frames per second (FPS).

Referring next to FIG. 7, there is shown curves 71 and 72 which depict, respectively, the integration of line 1 (row 1) pixels and line 512 (row 512) pixels. Also shown are two integration periods, namely, first integration period $t_1$ and second integration period $t_2$. It will be appreciated that FIG. 7 is similar to FIG. 6, except for the starting location of the second integration period $t_2$ (indicated by a heavy black dot). In FIG. 6, the starting location of the $t_2$ period falls within the gate ON time of the line 1 pixels. In FIG. 7, however, the starting location of the $t_2$ period falls within the gate OFF time of the line 1 pixels (shown as region 74).

Referring to FIG. 7, the line 1 pixels integrate according to curve 71. As shown, the line 1 pixels integrate during the entire photocathode gate ON time, integrating through region 73. The line 1 pixels integrate until reaching the pre-selected threshold Vreset1. The line 1 pixels stop integrating until reaching the second integration period $t_2$. The line 1 pixels, nevertheless, do not start integrating again, because the photocathode gate is now OFF. Accordingly, the line 1 pixels never experience the second integration period $t_2$, because the gate is OFF.

The line 512 pixels, on the other hand, integrate according to curve 72. As shown, the line 512 pixels integrate until the gate is turned OFF during region 73. After the gate is ON again, the line 512 pixels start integrating again, and continue integrating until the end of the frame period (60 HZ imager, as an example). Thus, the line 512 pixels reach a higher ADU than the line 1 pixels.

The line 1 pixels, thus, have no resolvable contrast above the clamping threshold of Vreset1. Since the line 1 pixels are clamped at the Vreset1 level, there is no additional voltage charge (or contrast) which may be used to correct the error during the second integration period. Having a photocathode gated frequency of 1 times (1×) the number of frames per second (FPS), as illustrated in FIG. 7, is a noticeable disadvantage. As will be explained, by increasing the gate frequency to a point where the photocathode gated pulse OFF period is shorter than the second integration period $t_2$, a contrast above the Vreset1 voltage level may be achieved by the present invention.

In summary, the present invention allows for using a variable well, a photocathode gated pulse and a rolling shutter, without the difficulties described above with respect to FIG. 7. Furthermore, the present invention provides a correction method for the non-uniformity induced in a resulting image by the timing interactions among the three aforementioned components. In addition, the present invention provides timing relationships for the imaging system that may be maintained for any possible correction method.

Figure 8:
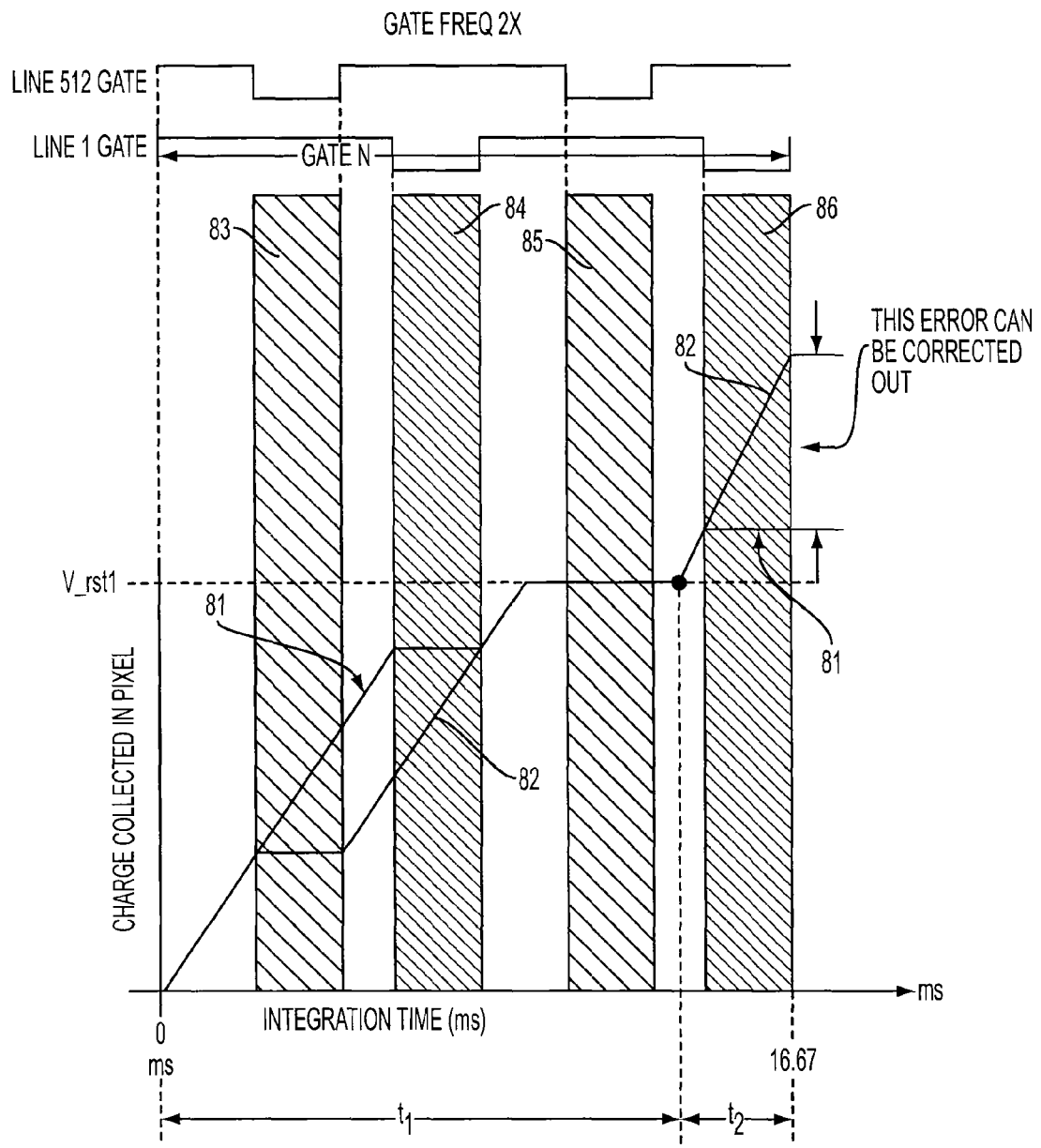
FIG. 8 is yet another exemplary timing diagram showing charges accumulated on pixels in two different rows of an imaging array, during a rolling shutter operation and a photocathode ON/OFF gating operation, in which the gating frequency is 2 times (2×) the number of frames per second (FPS).

In order to obtain an image that is correctable in a post processing step, the timing of the three components of the system is controlled by the present invention, so that every row experiences at least some portion of the integration time during the second integration period in a variable well scheme. The manner in which the present invention accomplishes this is by increasing the gating frequency of the photocathode. This is described further below by reference to the graphic curves shown in FIG. 8. Of importance in FIG. 8 is making sure that every row has a chance to integrate above a clamping voltage preset by a variable well approach.

The inventors discovered that the gating frequency of the photocathode requires a relationship with a minimum time in which the imager may spend during the second integration period of a variable well approach. This may be described by the following relationship:

$$(gate\_off\_time/gate\_pulse\_per\_frame) + \beta < T\_int2,$$

where $\beta$ is an additional factor that is tied to a grayscale resolution that may be achieved during the second integration period of the variable well approach by including a minimum amount of integration time for the second integration period.

Figure 9:
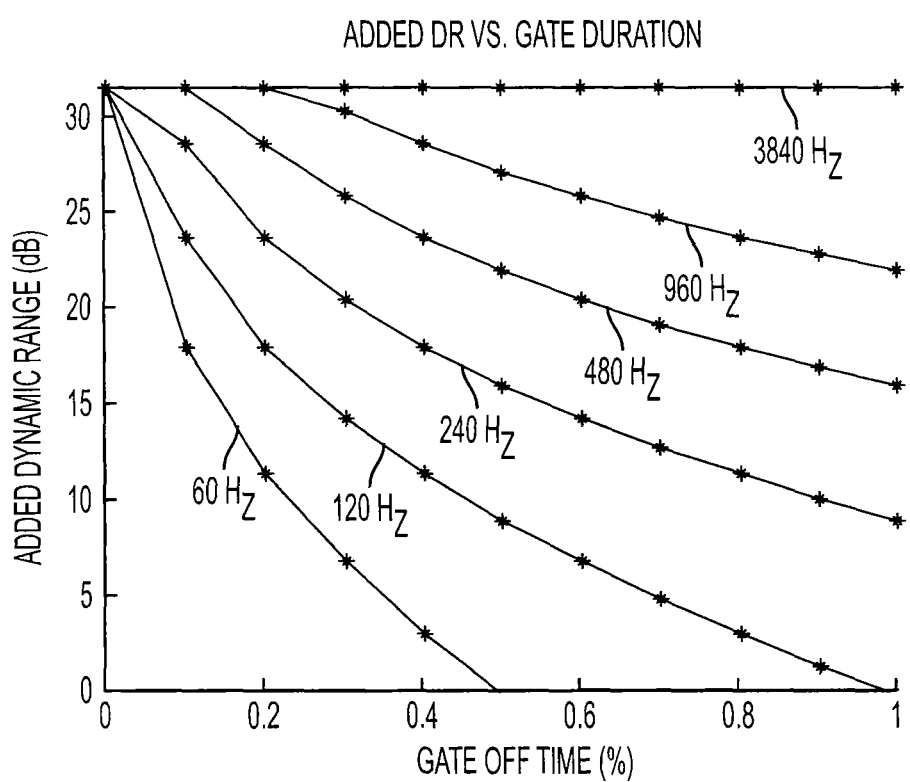
FIG. 9 is a plot of added dynamic range in dB versus a photocathode gate OFF time duration in percent, for different gating frequencies provided by the present invention.

The shorter the time that the imager spends in the second integration period of a variable well approach, the higher the input light/current that the imager may see without saturating the imager. This results in a higher dynamic range. Thus, in order to shorten the second integration period, using the relationship above, the gating frequency is increased by the present invention. FIG. 9 provides a graphic presentation that shows the improved relationship for an exemplary imager.

As shown in FIG. 9, dynamic range is increased as the gating frequency of the photocathode is also increased. For example, for a 60 Hz photocathode gating frequency and a 50% photocathode gating duty cycle, no increase in dynamic range is experienced by the present invention. However, for the same 60 Hz gating frequency, as the gating duty cycle is increased to 100% (or as shown in FIG. 9, the gating OFF time is decreased to zero), the dynamic range of the imager increases by as much as 30 dB.

By increasing the gating factor as the duty cycle deceases, the second integration period may be kept short, thereby obtaining extra dynamic range (DR). At a gating frequency of 960 Hz (16×60 FPS), a DR increase of 23 dB may be maintained down to at least 0.04% duty cycle (a minimum possible gate duty cycle). Given complications of increased gating frequency (such as increased EMI and increased power usage), a 16× gating frequency may be a good choice. At a gating frequency of 3.84 kHz (64×60 FPS), a DR increase of over 30 dB may be maintained down to at least 0.04% duty cycle. This gating frequency may also be a good choice.

It will be appreciated that pixel integration during the second integration period is the feature that provides the DR increase. By increasing the photocathode gating frequency to a point in which individual gating pulses are shorter than the second integration period, a contrast above the Vreset1 threshold may be achieved. This is illustrated, by way of example, in FIG. 8.

As shown in FIG. 8, the gating frequency is increased to 2 times (2×) the gating frequency of a 60 FPS imager (gating frequency of 120 Hz). Recall that FIG. 7 illustrated a gating frequency of 1× (or 60 Hz). In FIG. 8, the line 1 gate has twice the rate of the line 1 gate shown in FIG. 7; and the line 512 gate also has twice the rate of the line 512 gate shown in FIG. 7. As a consequence of increasing the gating frequency to twice that of the gating frequency shown in FIG. 7, the DR is increased.

The integration of a pixel in line 1 is shown by curve 81, whereas the integration of a pixel in line 512 is shown by curve 82. The line 1 pixel continues to charge through region 83 and stops to charge in region 84. The line 1 pixel continues to charge again after passing region 84. The line 1 pixel charges until clamped by the Vreset1 threshold voltage, and continues to be clamped until the pixel reaches the end of the first integration period $t_1$.

At the start of the second integration period $t_2$, however, the line 1 pixel is released to continue charging. The line 1 pixel continues to charge above the Vreset1 threshold level, until stopped again by the second OFF period of the photocathode gated frequency (2×), shown as region 86. Thus, the line 1 pixel experiences some portion of integration time during the second integration period.

The integration of the line 512 pixels are shown by curve 82. The line 512 pixels continue charging until stopped by the first gate OFF period in region 83. After the gate is ON again (after passing region 83), the line 512 pixels continue charging until clamped by the Vreset1 threshold level. The line 512 pixels continue to be clamped through region 85 until arriving at the end of the first integration period. The line 512 pixels begin charging again, during the second integration period $t_2$, because the line 512 gate is ON, and do not stop charging until reaching the end of the frame. Thus, the line 512 pixels experience some portion of integration time during the second integration period (the portion is longer than the portion allocated for line 1 pixels).

By comparing FIG. 8 with FIG. 7, it will be appreciated that integration during the second integration period t2 is the driver for increasing the dynamic range for the imager. The gate OFF period, thus, is selected by the present invention to be smaller than the second integration period t2. In this manner, every row of pixels experiences some integration during a portion of the second integration period. In FIG. 7, the line 1 pixels never experience the second integration period, because the photocathode gate is OFF. In FIG. 8, however, the line 1 pixels reach a charge level above the selected Vreset1 voltage.

Any error in contrast between the peak voltage of curve 81 and the peak voltage of curve 82 may be corrected by using the following reasoning:

(1) The relationship between gating and integration is known.

(2) Based on the integration time for a row and the resultant ADU output level, the input current to the pixel may be calculated.

(3) For pixels that never reach a clamping voltage, the input current may be calculated exactly.

(4) For pixels above the clamping voltage, there is ambiguity as to whether the pixel reached the clamping voltage during the first integration period, or the second integration period was required to reach the threshold. This does result in some residual error.

(5) Assuming the input current is constant during the integration period, the current may be calculated by varying the time that the pixel is assumed to be clamped, in order to maximize the calculated input current.

(6) Provided these conditions are met, the correction technique is very effective. As the time in the second integration period is reduced, however, the number of gray scales may be reduced and there may be a potential for SNR issues where noise is amplified or creates errors during post processing.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An imaging system comprising
a photocathode, configured to be gated ON/OFF at a selected gating frequency, for converting photons from an object into electrons and selectively transmitting the electrons toward an imaging sensor,
the imaging sensor, configured to receive the electrons and provide a rolling shutter read out of rows of pixels, and
the imaging sensor including a variable well selectively set to charge the rows of pixels to a first intensity level during a first integration period and charge to a second intensity level during a second integration period,
wherein the second integration period is longer than an OFF time of the photocathode gating frequency,
the photocathode is configured to be gated OFF with a pulsed signal, denoted as a gate_off_time,
the photocathode includes at least one gate_off time per frame of the imaging sensor, denoted as one gate_pulse_per_frame, and
the selected gating frequency includes a time period expressed as follows:
(gate_off_time/gate_pulse_per_frame) is less than the second integration period.

2. The imaging system of claim 1 wherein
the first and second integration periods are equal to a frame duration of the imaging sensor, defining a number of frames per second, and
the selected gating frequency of the photocathode is higher than the number of frames per second.

3. The imaging system of claim 2 wherein
the first intensity level is a variable set by a Vreset1 voltage, and
the second intensity level is greater than or equal to the first intensity level.

4. The imaging system of claim 3 wherein
the second intensity level is less than or equal to a full well level of a pixel in the rows of pixels.

5. The imaging system of claim 2 wherein
the rolling shutter readout provides a sequential read out of each row of pixels during at least one of the first and second integration periods, and
each row of pixels is read out at a frequency of the number of frames per second.

6. The imaging system of claim 1 wherein
the time period of the (gate_off_time/gate_pulse_per_frame) is less than the second integration period by a factor of beta,
where beta is an additional factor for providing a minimum amount of integration time.

7. The imaging system of claim 1 wherein
the selected gating frequency is increased to provide at least two gate_pulse_per_frame.

8. The imaging system of claim 7 wherein
the selected gating frequency is at least 120 Hz, and
a number of frames per second of the imaging sensor is 60 Hz.

9. The imaging system of claim 7 wherein
the selected gating frequency is at least 960 Hz, and
a number of frames per second of the imaging sensor is 60 Hz.

10. A method of imaging comprising the steps of:
gating a photocathode ON/OFF at a selected gating frequency;
receiving electrons from the photocathode, by an imager using a rolling shutter;
selectively charging pixels of the imager using a first integration period and a second integration period; and
controlling the second integration period, so that it is longer than an OFF time period of the selected gating frequency,
wherein the photocathode is configured to be gated OFF with a pulsed signal, denoted as a gate_off_time,
the photocathode includes at least one gate_off time per frame of the imaging sensor, denoted as one gate_pulse_per_frame, and
the selected gating frequency includes a time period expressed as follows:

(gate_off_time/gate_pulse_per_frame) is less than the second integration period.

11. The method of claim 10 wherein
charging the pixels is provided during a frame period, defining a number of frames per second, and
the selected gating frequency is higher than the number of frames per second.

12. The method of claim 10 wherein
the time period of the (gate_off_time/gate_pulse_per_frame) is less than the second integration period by a factor of beta,
where beta is an additional factor for providing a minimum amount of integration time.

13. The method of claim 10 wherein
the selected gating frequency is increased to provide at least two gate_pulse_per_frame.

* * * * *